Figure 1:
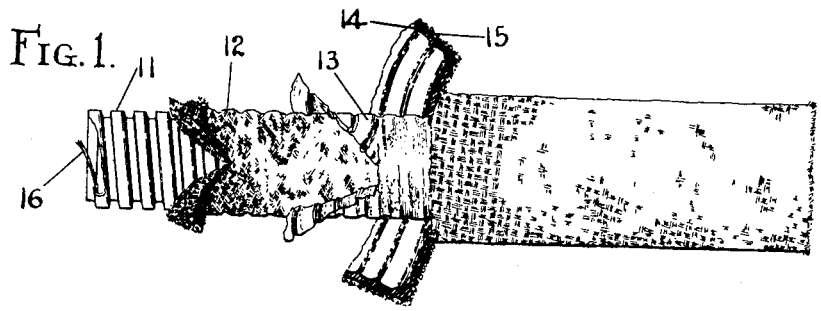

Sept. 5, 1939.                R. A. RAMSDELL                 2,171,764
                     METHOD FOR MAKING SEAMLESS TUBING
                         Filed March 16, 1935

INVENTOR.
Robert A. Ramsdell
BY Charles F. Daley
ATTORNEY.

Patented Sept. 5, 1939

2,171,764

UNITED STATES PATENT OFFICE 2,171,764

METHOD FOR MAKING SEAMLESS TUBING

Robert A. Ramsdell, Syosset, N. Y., assignor, by mesne assignments, to E. I. du Pont de Nemours & Company, Wilmington, Del., a corporation of Delaware Application March 16, 1935, Serial No. 11,523

4 Claims. (Cl. 154—8)

This invention relates to flexible hose or tubing for the conduction of liquids, particularly gasoline and the like, and the process for the production thereof. More particularly, it relates to the production of such a hose or tubing in which the component parts of the tubing are so constructed and arranged as to withstand harmful contact by certain of such component parts with the liquid to be conducted, and having an increased resistance to mechanical stresses.

Lengths of hose, such as are used at filling stations to dispense gasoline to motorists and other gasoline users, must be made flexible in order that the receptacle in the automobile or the like may conveniently be reached, irrespective of its position. In order to attain this result and at the same time secure the necessary strength, toughness and durability in the tubing to withstand long and constant usage, rough handling and adverse weather conditions, it has been customary to construct such hose out of flexible, metallic strips helically wound and interlocked. In order to permit sufficient flexibility, the joints between adjacent coils of the metal helix must be sufficiently open to allow for a certain amount of play therebetween. Such open joint structure has the disadvantage of permitting the leakage of liquid therethrough. To avoid the resulting leakage, a rubber composition is commonly placed around the metallic core, filling the ridges and recesses of the same. Play in the joints of the metallic core will thus be somewhat limited, so that as little liquid as possible will reach the rubber layer. Surrounding the rubber composition, a woven cord fabric forms the surface exposed to the weather. The rubber layer is then vulcanized to form a continuous and impervious solid layer.

To increase the flexibility of this construction and to prevent the possibility of particles of rubber being chipped off by the sharp-edged metallic core, thus contaminating the gasoline, it has been previously suggested to place a fabric covering over the metallic core before forming the rubber layer thereon. The increased flexibility, however, increases the possibility of gasoline seeping through the joints of the core and reaching the rubber.

The principal disadvantage of this construction is that commercial rubber is susceptible to attack of gasoline and similar hydrocarbon liquids. Over a period of time the gasoline will gradually attack and dissolve the rubber and eventually the hose structure will be sufficiently broken down to form leakages, with the resultant necessity for replacement. In an attempt to solve this difficulty, it has been known to helically wind a sheet or strip of regenerated cellulose or other non-fibrous cellulosic material on the metallic core. The difficulty with this procedure is that the sheeting cannot be wound tightly enough to form-fit the ridges and recesses of the flexible core. The sheeting will therefore easily rupture during the application of the rubber sheathing. It is also difficult to obtain good liquid-tight joints between the overlapping coils of the regenerated cellulose helix. Furthermore, when a rubber composition is subsequently solidified and vulcanized into place, a rough surface will form on the interior thereof, which will render it more susceptible to attack by the gasoline.

It is therefore an object of this invention to produce a flexible hose or tubing for the conduction of liquids, all the component parts of which will withstand long continued and hard usage without deleterious effects thereto, which will not be attacked or destroyed by the liquid conducted therethrough and which will at the same time be readily flexible to permit access to any desired point.

It is another object of this invention to produce a flexible hose or tubing suitable for use in conducting liquids which will act as a solvent for certain elements of said hose.

It is still another object of this invention to provide a process for protecting soluble elements of a flexible hose or tubing against deteriorating influences of solvent liquors to be conducted therethrough.

Other objects of the invention will appear hereinafter.

The objects of this invention are accomplished, in general, by placing over the metallic core, previously supplied with a fabric covering as a cushioning layer, a seamless tube of non-fibrous cellulosic material in the wet or gel state, which is then snugly shrunk into place as the result of the loss and/or evaporation of its contained moisture or other wetting agent. The rubber covering is then placed in position and vulcanized to form a tight fit over said seamless cellulosic tube.

The details of the invention will be more clearly apparent by reference to the following specific description taken in connection with the accompanying illustrations of one embodiment of the means and method of practicing the invention, it being understood that the invention is not to be limited thereby.

In the drawing, Fig. 1 is a perspective view of a gasoline hose made in accordance with this invention, with parts laid back to show more clearly the construction thereof. Figs. 2, 3, 4 and 5 are diagrammatic perspective views of means for performing the essential successive steps in the manufacture of tubing in accordance with this invention.

This invention will be described with particular reference to the use of seamless tubing composed of regenerated cellulose made from viscose, it being understood that seamless tubing of other materials which are inert to the liquid to be conducted through the hose and which are adapted to be later shrunk into contact with the hose assembly may be used equally well. As examples of other materials which may be used may be mentioned cellulosic materials such as cellulose esters and ethers coagulated in an aqueous coagulating bath, regenerated cellulose made from a cuprammonium solution, film-forming resinous materials having a certain amount of elasticity, gelatin, casein, and the like.

In the drawing, 11 designates the flexible metallic core, 12 a fabric interlayer, 13 the shrunken tube of cellulosic material, 14 a rubber layer, and 15 a woven cord layer.

The flexible metallic core 11 is preferably of the well known ribbed construction helically wound in such a fashion that the adjacent coils of the helix interlock. There is also preferably provided a single cord 16 helically wound and positioned between the interlocking faces of the adjacent coils of the helix comprising the metallic core. This prevents chafing and wearing away of the metallic surfaces.

Over the metallic core is formed a fabric interlayer 12, of any desired material such as cotton or the like. It is placed snugly in position by weaving or braiding in situ. In this way it is possible to secure a tightly fitting interlayer or cushion for the regenerated cellulose tubing, said interlayer being substantially free of creases, wrinkles and other harmful features which tend to injure the regenerated cellulose tubing.

The interlayer is then preferably saturated with glycerine or other softener which is substantially non-volatile and is substantially insoluble in the liquid to be passed through the hose, both in order to soften the interlayer and to provide an excess amount of softener for supplying the regenerated cellulose tube, especially during the application of the heat necessary for the vulcanization of the rubber, and to prevent the softener from exuding from the regenerated cellulose tube into the porous interlayer.

Figure 2:
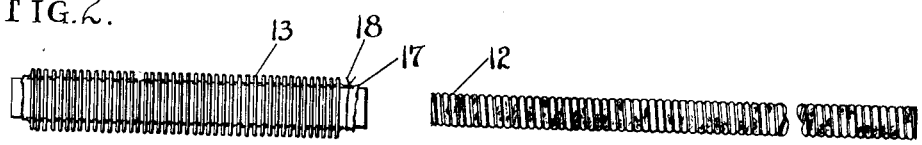
Figure 3:
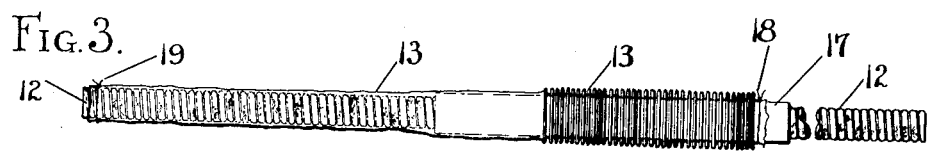

The hose assembly is now ready for placing in position thereon the seamless tube of regenerated cellulose or other non-fibrous cellulosic material, as illustrated in Figs. 2 and 3.

The seamless tube of regenerated cellulose is made in a well-known manner by extruding a solution of viscose through an annular orifice into an acid coagulating bath, after which it is suitably purified and treated with a suitable softening agent such as glycerin.

A predetermined length of this seamless non-fibrous and substantially non-porous cellulosic tubing, which is in the gel or undried state is shirred on to a hollow mandrel 17. This operation consists in folding up or telescoping the tubing so that a long length of tubing can be placed on a short length of hollow mandrel. The mandrel should be slightly smaller than the tubing so that it will be easy to place the tubing thereon and so that it will be maintained loosely in position. One end 18 of the shirred seamless tubing 13 is temporarily fastened to the hollow mandrel.

Figure 4:
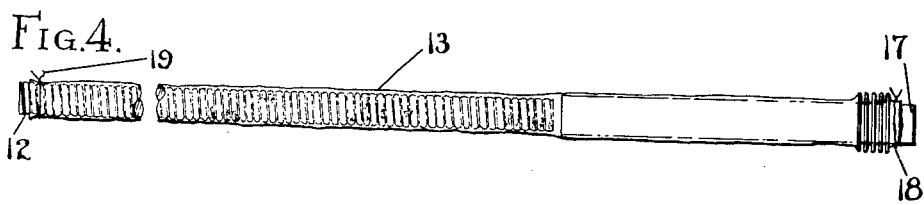
Figure 5:

A predetermined length of the above-mentioned hose assembly, with the fabric interlayer positioned thereover, is then pushed into the end of the hollow mandrel at which the seamless tubing is fastened (see Fig. 2), the inside diameter of the mandrel being slightly larger than the outside diameter of the combined metallic core and fabric interlayer. When the entering end of the combined metallic core and fabric interlayer reaches the exit end of the hollow mandrel, the loose end of the seamless regenerated cellulose tubing is fastened temporarily to the end of the interlayer 12 as shown at 19 in Fig. 3. As the other end of the tubing 13 is fastened to the hollow mandrel, both ends will be fast. The combined core 11 and interlayer 12 is gradually pushed through the hollow mandrel whereby it will pull the tubing 13 along and thereby reverse the above-mentioned telescoping operation so that the tubing lies in a long length over the core and interlayer. When this operation is complete, the seamless tubing 13 will be stretched somewhat tautly, as shown in Fig. 4. Both ends of the tubing are then preferably relieved of their temporary fastenings and the mandrel 17 withdrawn. On the other hand, the ends of the cellulosic tube may be fastened to the ends of the core and interliner so that the shrinkage in the cellulosic tubing will take place almost altogether in a radial direction. The seamless tubing 13 is then allowed to shrink as the result of the evaporation of its contained water. In this manner it shrinks into tight engagement with the interlayer 12 and fits snugly thereon as shown in Fig. 5. As the interlayer 12 is yielding in nature, this fit will not be harmful to the regenerated cellulose and in fact, will be a great advance over the prior art since it cannot fold upon itself to form wrinkles and creases which cause weakened spots and consequent rupture.

The regenerated cellulose of which the tubing is composed should be of such a nature that it will not become brittle over periods of time. Regenerated celulose tubing of this nature may be produced by incorporating therein in the well known manner a suitable softener, such as, for example, glycerin, diethylene glycol, triethylene glycol, sorbitol, pentaerythritol, carbamide, or suitable combinations thereof. This softener should preferably be present in a larger quantity than is customary with pellicles of similar thickness and character when used for other purposes. The reason that this is necessary is that the high temperatures employed in the vulcanizing step as described below will cause some of the water to be driven from the regenerated cellulose tubing, tending to render it brittle. To obviate this, large amounts of softener are used to restrain the loss of water. For example, when glycerin is used as the softener it is preferably present in quantities of 20% of the weight of the cellulose in the tubing.

The seamless tubing may also be treated with formaldehyde in order to toughen it and make it more resistant to the action of the heat which is necessary in the vulcanizing step. This may be done by passing the cellulosic tube, while in a gel state, into contact with gaseous formaldehyde.

The final step in the manufacture of the hose consists in placing a layer of unvulcanized rubber, preferably in the form of a liquid composition, around the combined metallic core 11, interlayer 12 and regenerated cellulose sleeve 13 so as to fit into reasonably close engagement therewith. Over this rubber layer is placed a woven fabric 15, preferably in seamless tubular form. When the two layers 14 and 15 are in place, they are vulcanized by means of heat and pressure so that the two are firmly interlocked and the rubber layer solidifies and presses the regenerated cellulose layer 13 firmly against the interlayer 12, flowing into any depressions in the surface thereof. The formed hose is then ready for use.

The above description illustrates a preferred method of accomplishing the results contemplated by this invention. It is obvious, of course, that many modifications in this procedure are possible. For example, the interlayer 12 may comprise a seamless tubular cotton sleeve, knitted or woven into form before being placed in position. This previously formed sleeve should be of slightly less diameter than the metallic core, said sleeve being stretchable or elastic in nature so that it can be placed over the metallic core. It can be drawn in position over the core 11 and will fit tightly as described above. Alternatively, the shirred sleeve may be placed on the inside of mandrel 17, or between two spaced hollow mandrels. Both interlayer or sleeve 12 and tubing 13 may then be simultaneously placed into position similar to the manner previously set forth.

It is also possible to draw a long length of unshirred seamless non-fibrous cellulosic tubing on to the core simultaneously with the interlayer or subsequent thereto. When the last mentioned procedure is followed, it is preferable to carry out the process very slowly to prevent any possible rupture in the tubing 13.

Tubing prepared in accordance with this invention can be used in the transportation or conduction of gasoline and other liquids which have a solvent action on rubber. The regenerated cellulose tubing serves to form a layer impervious to gasoline or other liquids so that it cannot reach the rubber. As the other components of the tube give the necessary strength and flexibility characteristics, it is seen that the tube offers many advantages over the prior art. The use of cellulosic materials previously formed into a seamless tubing has the advantage of being capable of being submitted to a leak test prior to its being incorporated in the hose. In previous tubes, for example, where non-fibrous cellulosic materials were used, the lack of a tight fit caused wrinkles or creases and consequent weakening and/or rupture so that the gasoline or other liquid was allowed to reach the rubber. The present invention overcomes all these disadvantages and results in a hosing which is exceptionally useful for dispensing gasoline at automobile service stations, air ports, docks, etc.

Obviously, many changes and modifications can be made in the above description of the method and means of operation without departing from the nature and spirit of the invention. It is therefore to be understood that the invention is not to be limited except as set forth in the appended claims.

I claim:

1. In the method of constructing hose, the steps comprising forming a hose core having a fabric covering thereon, applying glycerin on said fabric covering, and shrinking a wet seamless tubing of non-fibrous cellulosic material onto the surface of said core by the removal of moisture from said tubing, and vulcanizing a rubber covering onto the outer surface of said tubing.

2. In the method of constructing hose, the steps comprising forming a hose core having a fabric covering thereon, applying a softening agent for non-fibrous cellulosic material on said fabric covering, and shrinking a seamless tubing of regenerated cellulose in the gel state onto the surface of said core by the removal of moisture from said tubing, and vulcanizing a rubber covering onto the outer surface of said tubing.

3. In the method of constructing hose, the steps comprising forming a hose core having a fabric covering thereon, placing a seamless tubing of non-fibrous cellulosic material onto a hollow mandrel, moving said fabric-covered core through said hollow mandrel, and fastening one end of said tubing to said core whereby to cover said core with said tubing as the core passes through said mandrel.

4. In the method of constructing hose, the steps comprising forming a hose core having a fabric covering thereon, applying glycerine on said fabric covering, placing a seamless tubing of regenerated cellulose onto a hollow mandrel, moving said fabric-covered core through said hollow mandrel, and fastening one end of said tubing to said core whereby to cover said core with said tubing as the core passes through said mandrel.

ROBERT A. RAMSDELL.